(12) United States Patent
Hayakawa

(10) Patent No.: US 11,305,731 B2
(45) Date of Patent: Apr. 19, 2022

(54) VEHICLE TRAVELING CONTROL METHOD AND VEHICLE TRAVELING CONTROL DEVICE

(71) Applicants: Nissan Motor Co., Ltd., Yokohama (JP); Renault S.A.S., Boulogne-Billancourt (FR)

(72) Inventor: Yasuhisa Hayakawa, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/299,666

(22) PCT Filed: Dec. 11, 2018

(86) PCT No.: PCT/IB2018/001544
§ 371 (c)(1),
(2) Date: Jun. 3, 2021

(87) PCT Pub. No.: WO2020/121009
PCT Pub. Date: Jun. 18, 2020

(65) Prior Publication Data
US 2022/0032874 A1    Feb. 3, 2022

(51) Int. Cl.
*B60R 25/24* (2013.01)
*B60R 25/20* (2013.01)
(Continued)

(52) U.S. Cl.
CPC .......... *B60R 25/241* (2013.01); *B60R 25/209* (2013.01); *G06K 7/1417* (2013.01);
(Continued)

(58) Field of Classification Search
CPC .... B60R 25/241; B60R 25/24; G08G 1/0141; G06Q 10/02; Y02T 10/70; G05B 23/0208; G05K 7/00; G07C 9/00896
See application file for complete search history.

(56) References Cited

U.S. PATENT DOCUMENTS 10,991,242 B2 *   4/2021   Taylor ................. G08G 1/0141
2018/0065537 A1   3/2018   Abrams et al.

FOREIGN PATENT DOCUMENTS

CN    103359053 A  * 10/2013   ......... G07C 9/00896
CN    105501006 A  *  4/2016   ............... G05K 7/00
(Continued)

*Primary Examiner* — Yuri Kan
(74) *Attorney, Agent, or Firm* — Young Basile Hanlon & MacFarlane, P.C.

(57) ABSTRACT

Upon autonomous travel control of a subject vehicle having an autonomous travel control function based on a remote operation command from a remote operation device located outside the subject vehicle, when start of a remote operation by the remote operation device is input, a predetermined authentication code stored in the subject vehicle is displayed inside or outside the vehicle so as to be visible, the displayed authentication code is acquired by the remote operation device, a determination is made whether or not the authentication code acquired by the remote operation device matches the authentication code stored in the vehicle, and upon matching, a paring process between the vehicle and the remote operation device is completed.

13 Claims, 15 Drawing Sheets

(51) Int. Cl.
  *G06K 7/14* (2006.01)
  *H04L 67/12* (2022.01)
  *B60W 60/00* (2020.01)
  *G01C 21/36* (2006.01)

(52) U.S. Cl.
  CPC ........... *H04L 67/12* (2013.01); *B60W 60/001* (2020.02); *G01C 21/36* (2013.01)

(56) References Cited

FOREIGN PATENT DOCUMENTS

| | | | | | |
|---|---|---|---|---|---|
| CN | 106249732 | A | * | 12/2016 | ......... G05B 23/0208 |
| CN | 107804217 | A | | 3/2018 | |
| CN | 108263337 | A | * | 7/2018 | ............ B60R 25/24 |
| CN | 108622017 | A | | 10/2018 | |
| EP | 2211499 | A1 | | 7/2010 | |
| EP | 3373624 | A1 | | 9/2018 | |
| JP | 2017-135875 | A | | 8/2017 | |
| JP | 2017135875 | A | * | 8/2017 | ............ Y02T 10/70 |
| JP | 2018-112847 | A | | 7/2018 | |
| JP | 2018112847 | A | * | 7/2018 | ............ G06Q 10/02 |
| JP | 2018-189939 | A | | 11/2018 | |
| WO | 2018/083799 | A1 | | 5/2018 | |

* cited by examiner

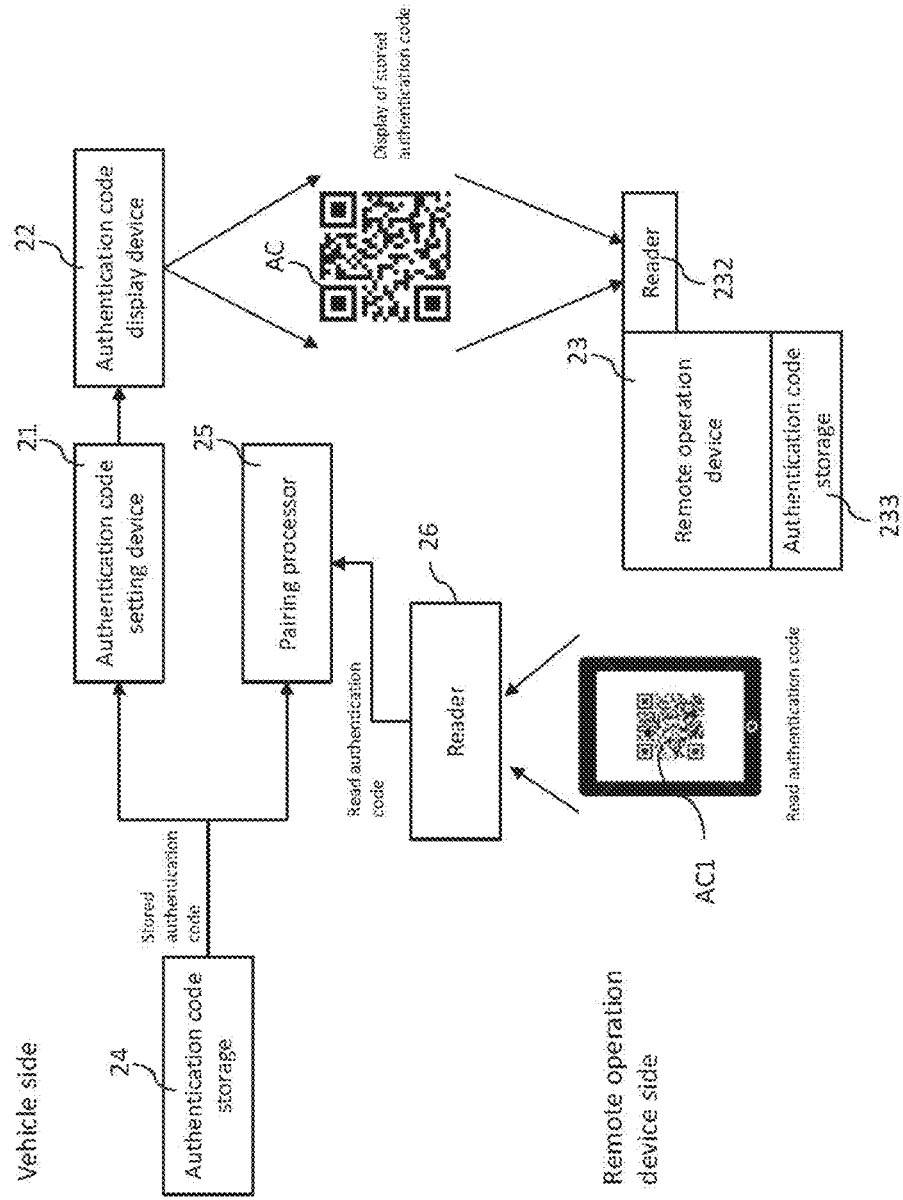

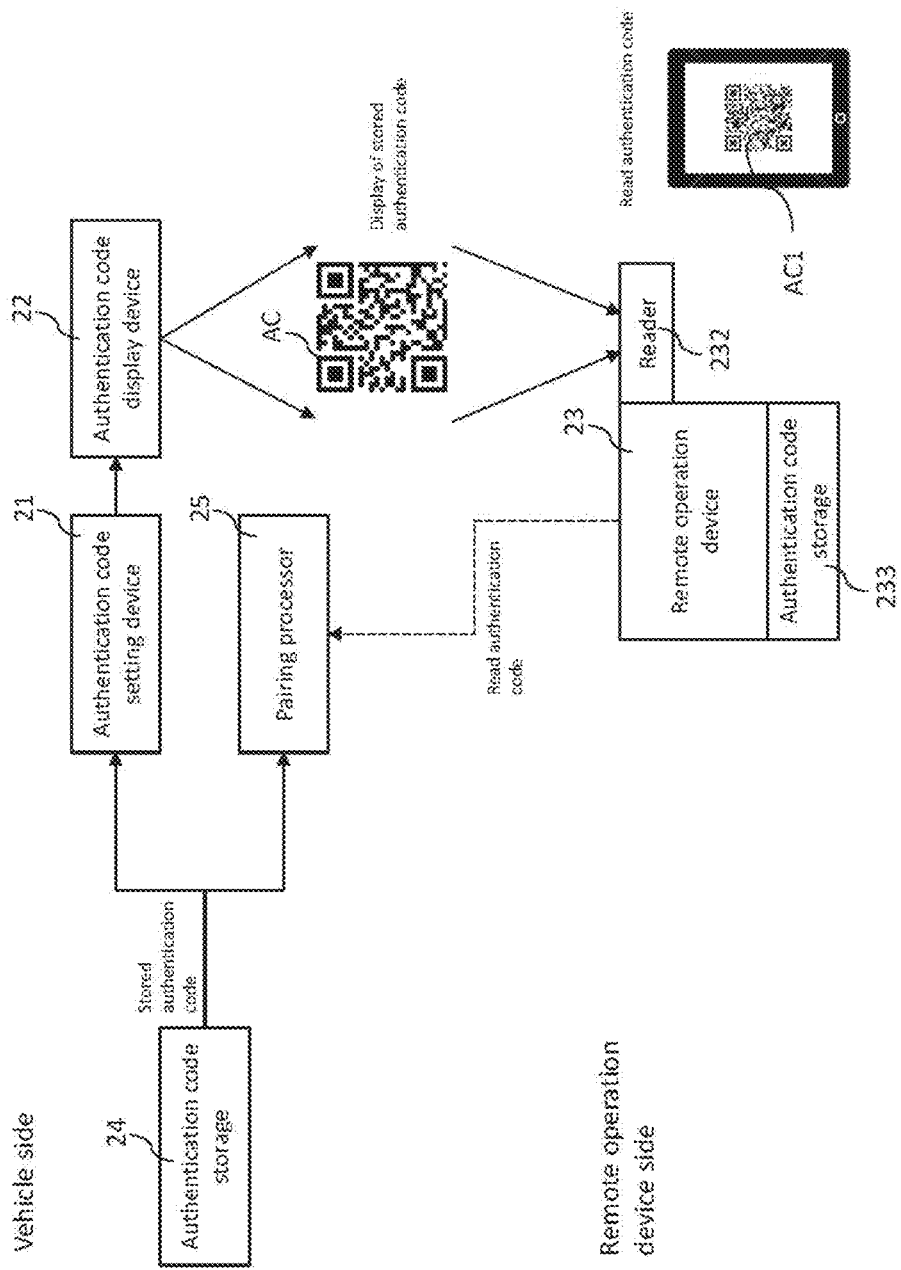

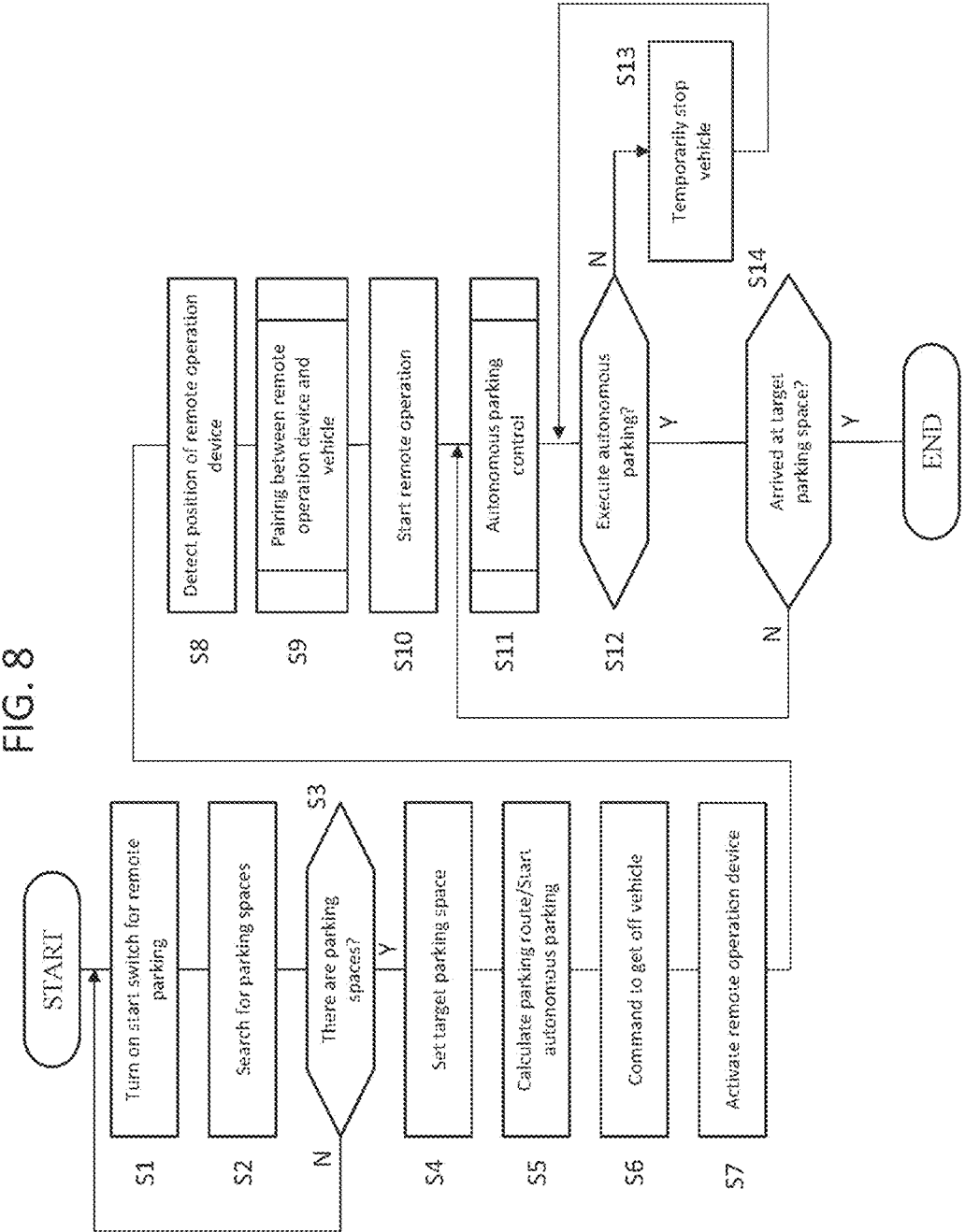

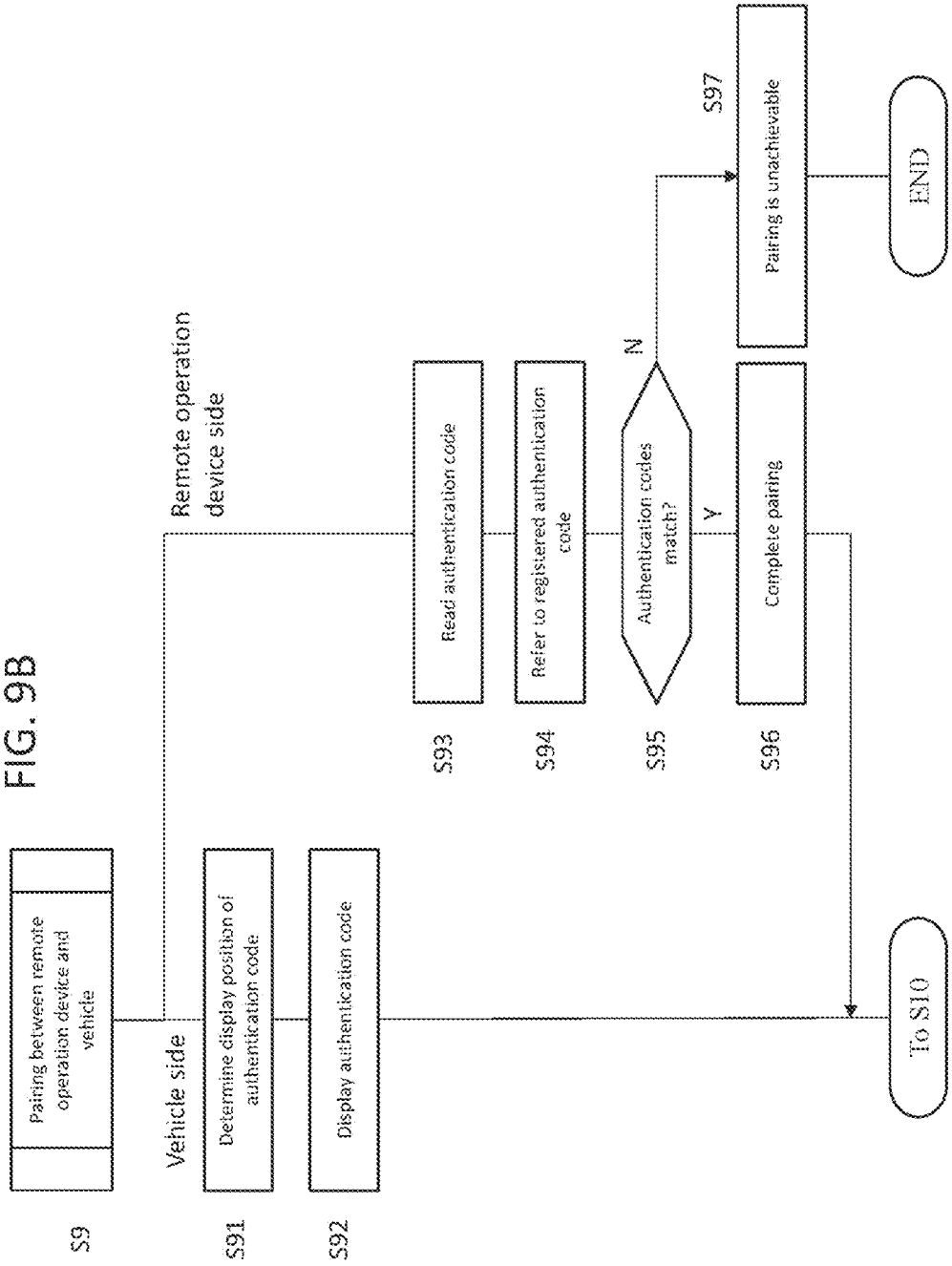

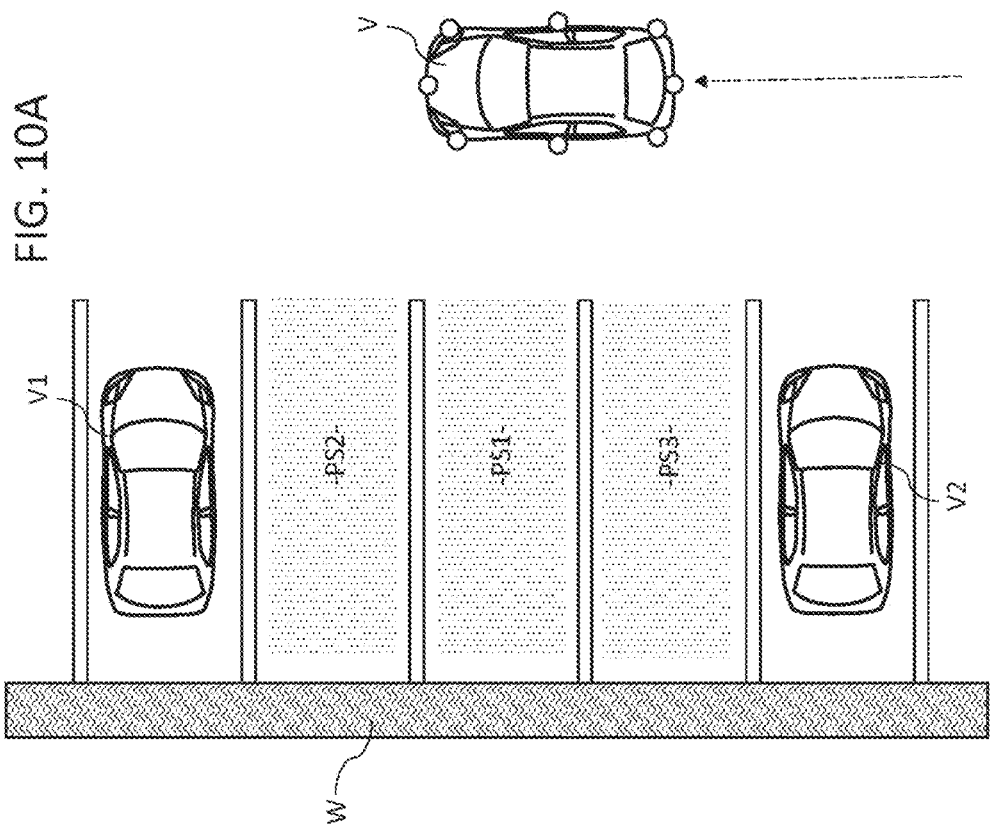

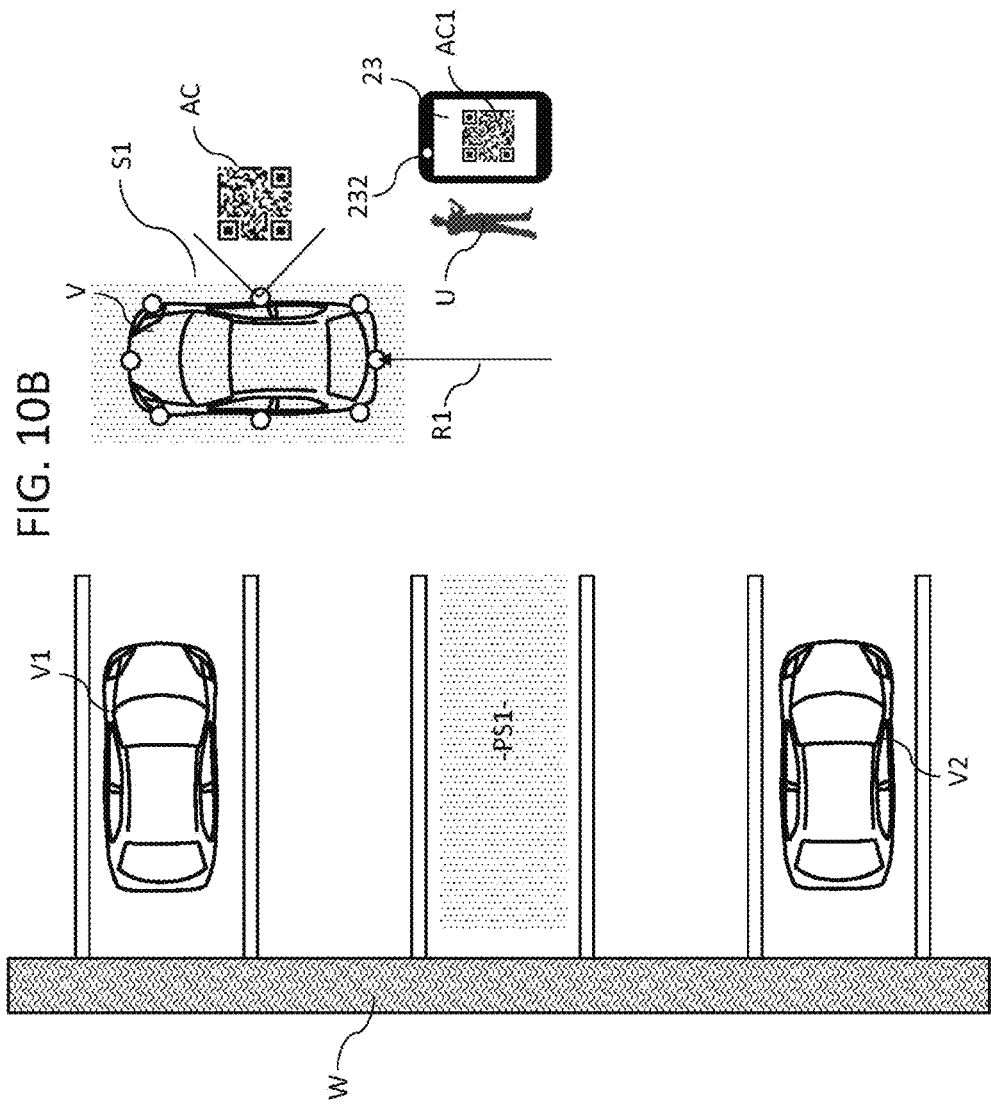

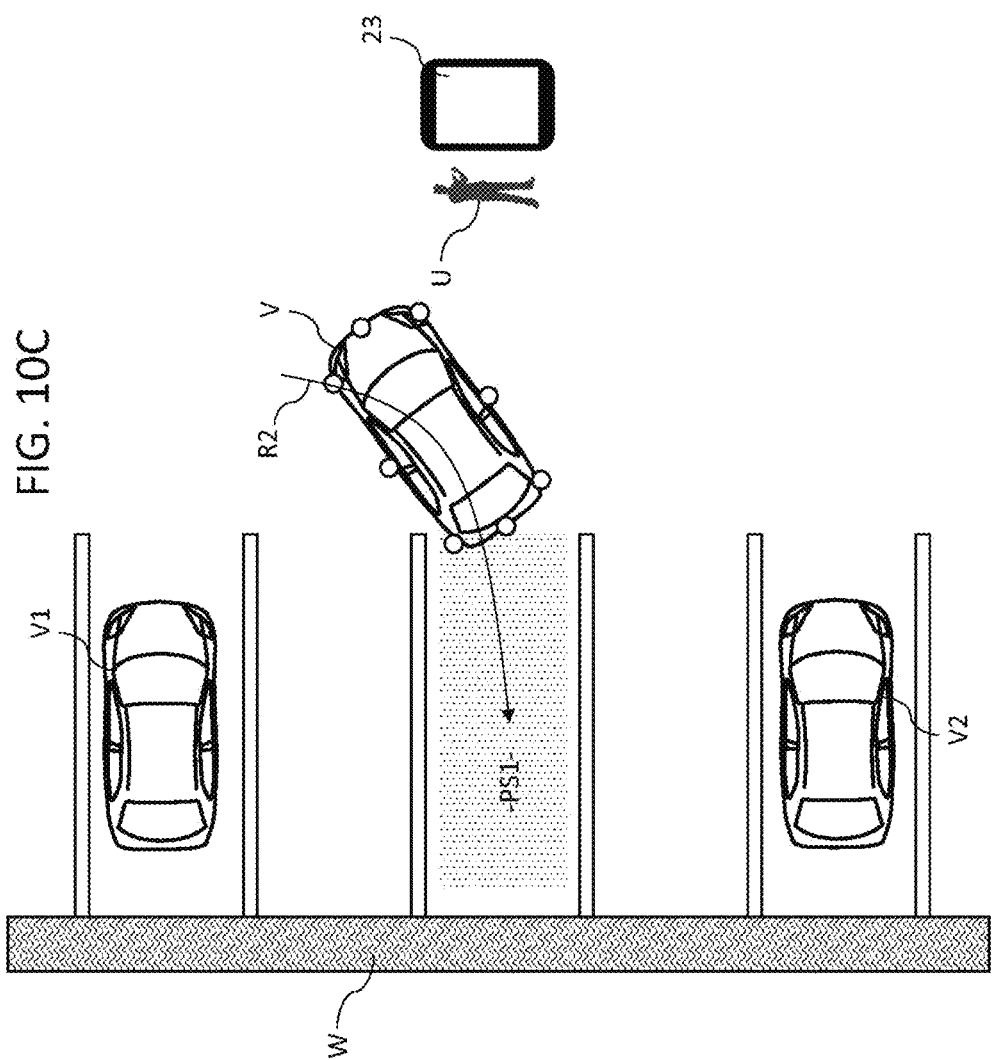

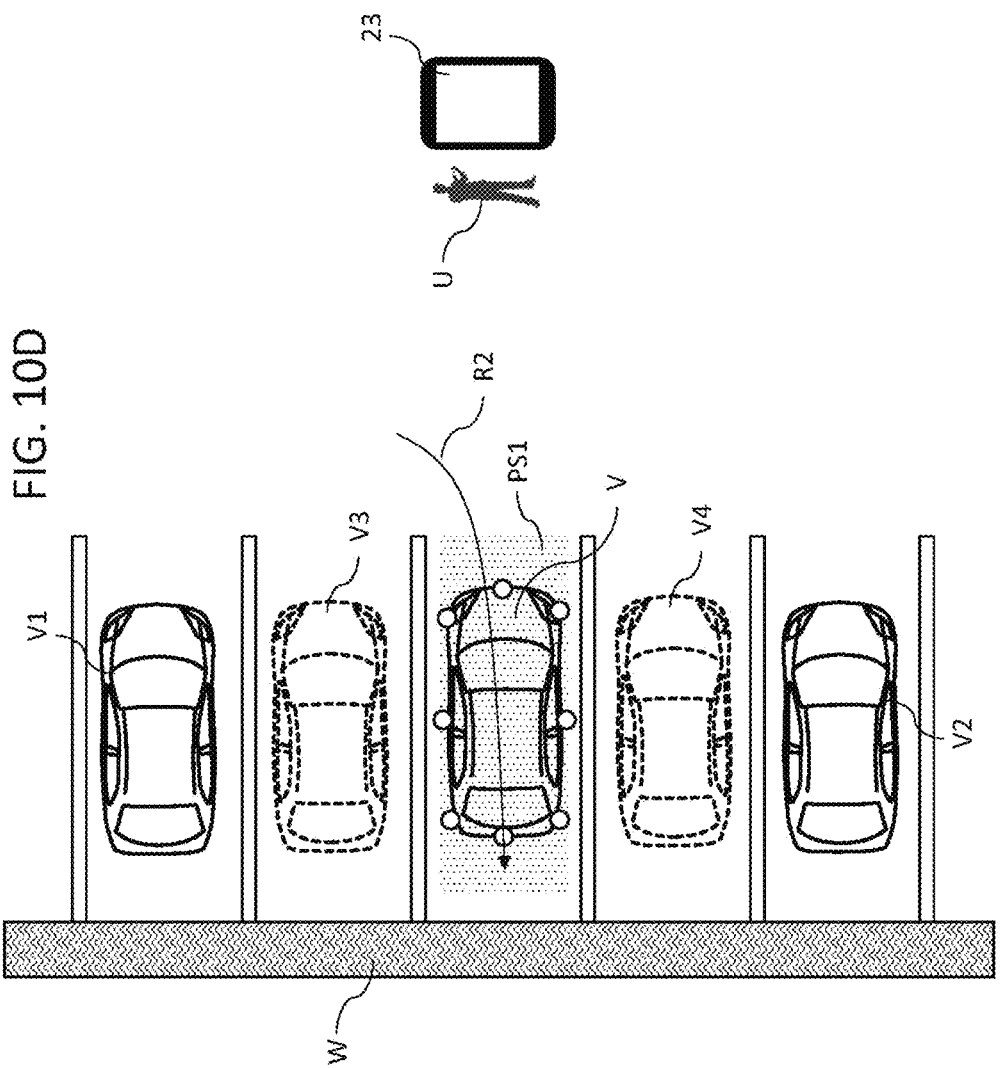

VEHICLE TRAVELING CONTROL METHOD AND VEHICLE TRAVELING CONTROL DEVICE

TECHNICAL FIELD

The present invention relates to a vehicle travel control method and a vehicle travel control apparatus for remotely operating a subject vehicle capable of autonomous travel control.

BACKGROUND

A non-contact power transmission system for supplying electric power to the battery of a vehicle is known (JP2017-135875A). When performing a paring process between a power transmission device and a power reception device, the power transmission device instructs, through radio communication, the power reception device to control a light emitting unit to emit light with a predetermined emission pattern. When the predetermined emission pattern instructed through the radio communication is coincident with the emission pattern imaged by an imaging unit of the power transmission device, the pairing process is completed.

SUMMARY

In the above prior art, however, when the light emitting unit of the power reception device is within an imaging range of the imaging unit of the power transmission device on the assumption that the imaging range is limited, the vehicle is ensured to be parked at an appropriate position, and the installation position of the imaging unit is therefore limited to a specific position. Thus, the above prior art cannot be applied to a case in which the stop position of a vehicle is an arbitrary place, such as a case in which autonomous parking is performed by a remote operation.

A problem to be solved by the present invention is to provide a vehicle travel control method and a vehicle travel control apparatus with which, when a subject vehicle capable of autonomous travel control is remotely operated from outside the vehicle, a pairing process between the vehicle and a remote operation device can be easily performed.

The present invention solves the above problem through, when start of a remote operation is input, displaying a predetermined authentication code stored in a vehicle inside or outside the vehicle so as to be visible, acquiring the displayed authentication code by a remote operation device, determining whether or not the authentication code acquired by the remote operation device matches the authentication code stored in the vehicle, and, upon matching, completing a paring process between the vehicle and the remote operation device.

According to the present invention, the predetermined authentication code, which is a key for the pairing process, is displayed from the vehicle inside or outside the vehicle, and the remote operation device acquires the displayed authentication code to determine the matching of the authentication code. This allows the pairing process to be executed by a simple method even when the autonomous travel control by the remote operation is performed for the subject vehicle, which is stopped at an arbitrary place, from outside the vehicle.

BRIEF DESCRIPTION OF THE DRAWINGS

FIG. 2A is a block diagram illustrating an example of a configuration related to a pairing process executed in the remote parking system of FIG. 1;

FIG. 2B is a block diagram illustrating another example of a configuration related to a pairing process executed in the remote parking system of FIG. 1;

FIG. 8 is a flowchart illustrating the control procedure executed in the remote parking system of FIG. 1;

FIG. 9B is a flowchart illustrating another example of the subroutine of step S9 in FIG. 8;

FIG. 10A is a plan view (part 1) illustrating an example of remote reverse parking executed in the remote parking system of FIG. 1;

FIG. 10B is a plan view (part 2) illustrating an example of remote reverse parking executed in the remote parking system of FIG. 1;

FIG. 10C is a plan view (part 3) illustrating an example of remote reverse parking executed in the remote parking system of FIG. 1; and FIG. 10D is a plan view (part 4) illustrating an example of remote reverse parking executed in the remote parking system of FIG. 1.

DETAILED DESCRIPTION

Figure 1:
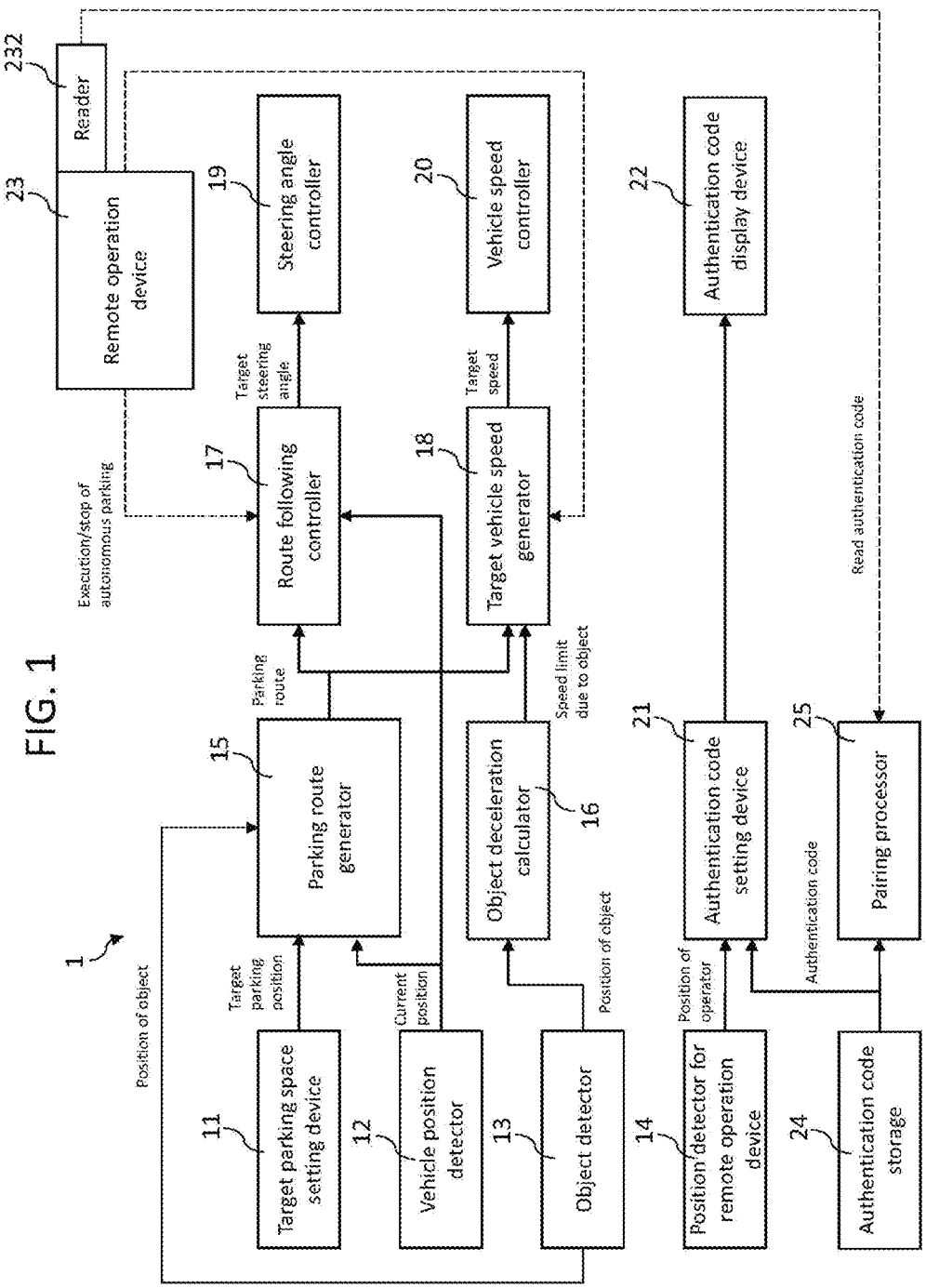
FIG. 1 is a block diagram illustrating a remote parking system to which the vehicle travel control method and vehicle travel control apparatus of the present invention are applied.

Hereinafter, one or more embodiments of the present invention will be described with reference to the drawings. FIG. 1 is a block diagram illustrating a remote parking system 1 to which the vehicle travel control method and vehicle travel control apparatus of the present invention are applied. In the present specification, "autonomous travel control" refers to controlling a vehicle to travel through automated or autonomous control executed by an onboard travel control apparatus without relying on a driver's driving operation, while "autonomous parking control," which is one type of the autonomous travel control, refers to controlling a vehicle to park (enter or exit a parking space or a garage) through automated or autonomous control executed by an onboard travel control apparatus without relying on a driver's driving operation. Also in the present specification, "parking" refers to continuously stopping a vehicle in a parking space, but the term "parking route" encompasses not only a route for entry into a parking space or a garage but also a route for exit from a parking space or a garage. In this sense, the "vehicle travel control method and vehicle travel control apparatus used when parking" encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting. In the following embodiments, specific examples of the present invention will be described with reference to an example in which the travel control method and travel control apparatus according to the present invention are applied to the autonomous parking control by remote operation.

The remote parking system 1 according to one or more embodiments of the present invention is a system for performing the operation of entry into or exit from a parking space or a garage by the autonomous travel control when performing the operation. During the operation, the driver gets off the vehicle and continues to transmit an execution command from a remote operation device while confirming safety, thereby to maintain the autonomous parking control. When the vehicle may collide with an obstacle, the autonomous parking control is stopped by transmitting a stop command or stopping transmission of the execution command. In the following description, the autonomous travel control mode for entry with the use of remote operation will be referred to as a remote entry mode, and the autonomous travel control mode for exit with the use of remote operation will be referred to as a remote exit mode.

In a narrow parking space in which side doors cannot be fully opened, such as a narrow garage or a parking lot in which other vehicles are parked on both sides, for example, it may be difficult for the driver to get on or get off the vehicle. To enable parking even in such a case, the remote entry mode or remote exit mode is used together with the remote operation. In the case of entry into a parking space, after the remote entry mode is initiated to calculate the entry route into the selected parking space and start the autonomous entry control, the driver gets off the vehicle while carrying the remote operation device and continues to transmit the execution command from the remote operation device to complete the entry into the selected parking space. On the other hand, in the case of exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command from the remote operation device to complete the exit from the parking space and thereafter gets on the vehicle. Thus, the remote parking system 1 according to one or more embodiments of the present invention is a system that has the remote entry mode with the use of such a remote operation and the remote exit mode also with the use of remote operation. An example of the autonomous parking control will be exemplified as autonomous reverse parking control illustrated in FIGS. 10A to 10D, but the present invention can also be applied to autonomous parallel parking and other autonomous parking.

The remote parking system 1 according to one or more embodiments of the present invention includes a target parking space setting device 11, a vehicle position detector 12, an object detector 13, a position detector 14 for remote operation device, a parking route generator 15, an object deceleration calculator 16, a route following controller 17, a target vehicle speed generator 18, a steering angle controller 19, a vehicle speed controller 20, an authentication code setting device 21, an authentication code display device 22, a remote operation device 23, an authentication code storage 24, and a pairing processor 25. Each configuration will be described below.

In the remote entry mode, the target parking space setting device 11 searches for parking spaces existing around the subject vehicle, allows the operator to select a desired parking space from among available parking spaces, and outputs positional information of the parking space (such as the coordinates of a relative position from the current position of the subject vehicle and the latitude/longitude) to the parking route generator 15. In the remote exit mode, the target parking space setting device 11 searches for exit spaces existing around the subject vehicle which is currently parked, allows the operator to select a desired exit space from among available exit spaces, and outputs positional information of the exit space (such as the coordinates of a relative position from the current position of the subject vehicle and the latitude/longitude) to the parking route generator 15. The exit space refers to a temporary stop position for the subject vehicle at which the operator gets on the subject vehicle after performing the exit operation in the remote exit mode.

To achieve the above-described functions, the target parking space setting device 11 includes an input switch that inputs and operates the remote entry mode or the remote exit mode, a plurality of cameras (not illustrated, the object detector 13 to be described later may serve as the cameras) that capture images around the subject vehicle, a computer that is installed with a software program for searching for available parking spaces from image data captured by the cameras, and a touch panel-type display that displays an image including the available parking spaces. When an operator such as a driver selects the remote entry mode using the input switch, the cameras acquire the image data around the subject vehicle, and the display displays the image including the available parking spaces. When the operator selects a desired parking space from among the displayed parking spaces, the target parking space setting device 11 outputs the positional information of the parking space (such as the coordinates of a relative position from the current position of the subject vehicle and the latitude/longitude) to the parking route generator 15. Upon search for the available parking spaces, when the map information stored in a navigation device includes parking lot information having detailed positional information, the parking lot information may be used. When the operator such as the driver starts the internal combustion engine or drive motor of the subject vehicle using the remote operation device 23 and selects the remote exit mode via the input switch of the remote operation device 23, the cameras acquire the image data around the subject vehicle, and the display of the remote operation device 23 displays the image including the available exit spaces. Then, when the operator selects a desired exit space from among the displayed exit spaces, the target parking space setting device 11 outputs the positional information of the exit space (such as the coordinates of a relative position from the current position of the subject vehicle and the latitude/longitude) to the parking route generator 15.

The vehicle position detector 12 is composed of a GPS unit, a gyro sensor, a vehicle speed sensor, and other components. The vehicle position detector 12 detects radio waves transmitted from a plurality of satellite communications using the GPS unit to periodically acquire positional information of the subject vehicle and detects the current position of the subject vehicle on the basis of the acquired positional information of the subject vehicle, the angle change information acquired from the gyro sensor, and the vehicle speed acquired from the vehicle speed sensor. The positional information of the subject vehicle detected by the vehicle position detector 12 is output to the parking route generator 15 and the route following controller 17 at predetermined time intervals.

The object detector 13 is configured to search for whether or not an object such as an obstacle is present around the subject vehicle. The object detector 13 includes a camera, radar (such as millimeter-wave radar, laser radar, or ultrasonic radar), sonar, or the like or a combination thereof. The camera, radar, sonar, or the like or a combination thereof is attached to an outer panel part of the subject vehicle. The position to which the object detector 13 is attached is not particularly limited. One or more object detectors 13 can be attached, for example, to all or part of sites of the center and both sides of the front bumper, the center and both sides of the rear bumper, the sill outers below the right and left center pillars, and the like. Each object detector 13 further includes a computer installed with a software program for specifying the position of an object detected by the camera, radar, or the like, and the specified object information (target object information) and its positional information (such as the coordinates of a relative position from the current position of the subject vehicle and the latitude/longitude) are output to the parking route generator 15 and the object deceleration calculator 16. Before the start of the autonomous parking control, the specified object information and its positional information are used by the parking route generator 15 to generate a parking route. When an object such as an abrupt obstacle is detected during the autonomous parking control, the specified object information and its positional information are used by the object deceleration calculator 16 to decelerate or stop the subject vehicle.

Figure 7:
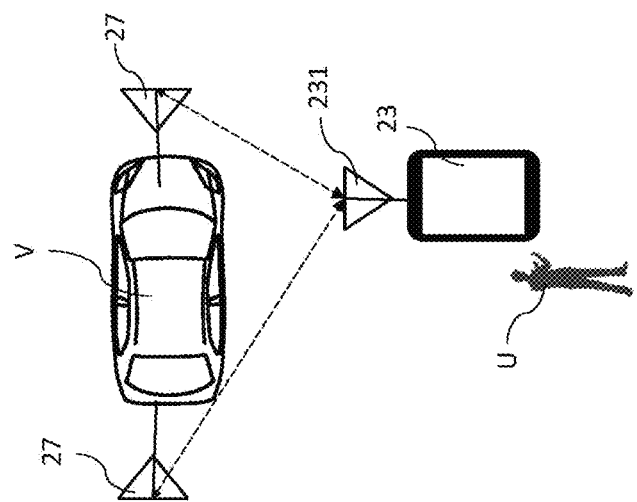
FIG. 7 is a diagram illustrating an example of a position detector for the remote operation device of FIG. 1.

The position detector 14 for the remote operation device 23 is a device for specifying the position of the remote operation device 23, which will be described later, when the remote operation device 23 is taken out of the vehicle. As illustrated in FIG. 7, for example, the position detector 14 is composed of at least two antennas 27 and 27 provided at different positions of the subject vehicle V, an antenna 231 of the remote operation device 23, sensors that detect radio field intensities between the antennas 27 and 27 of the vehicle V and the antenna 231 of the remote operation device, and a computer installed with a software program for calculating the position of the remote operation device 23 from the radio field intensities detected by the sensors using a triangulation method or the like. The radio waves for specifying the position of the remote operation device 23 are continuously transmitted at predetermined time intervals, and the position of the remote operation device 23, which changes momentarily, with respect to the subject vehicle V is specified, for example, as relative positional information to the subject vehicle V. The radio waves for specifying the position of the remote operation device 23 can be generated using the execution command signal from the remote operation device 23.

The radio waves for specifying the position of the remote operation device 23 may be transmitted from the antenna 231 of the remote operation device 23 to the antennas 27 and 27 of the vehicle V at predetermined time intervals or may also be transmitted from the antennas 27 and 27 of the vehicle V to the antenna 231 of the remote operation device 23 at predetermined time intervals. In the former case, the vehicle V is provided with the sensors that detect the radio field intensities between the antennas 27 and 27 of the vehicle V and the antenna 231 of the remote operation device and the computer installed with a software program for calculating the position of the remote operation device 23 from the radio field intensities detected by the sensors using a triangulation method or the like. In the latter case, the remote operation device 23 is provided with the sensors and the computer. The positional information of the remote operation device (positional information relative to the subject vehicle V) detected by the position detector 14 for the remote operation device 23 is output to the authentication code setting device 21. The remote operation device 23 is taken out of the vehicle by the operator, and therefore the positional information of the remote operation device 23 detected by the position detector 14 for the remote operation device 23 is also the positional information of the operator.

The parking route generator 15 receives the size of the subject vehicle (such as a vehicle width, a vehicle length, or a minimum turning radius) which is preliminarily stored, the target parking position (which refers to the positional information of the parking space in the case of the remote entry mode or the positional information of the exit space in the case of the remote exit mode, here and hereinafter) from the target parking space setting device 11, the current positional information of the subject vehicle from the vehicle position detector 12, and the positional information of an object (obstacle) from the object detector 13 and calculates a parking route from the current position of the subject vehicle to the target parking position (the parking route refers to the entry route in the case of the remote entry mode or the exit route in the case of the remote exit mode, here and hereinafter). The parking route is calculated so as not to collide or interfere with an object. FIGS. 10A to 10D are plan views illustrating an example of the remote entry mode. At the current position of the subject vehicle V illustrated in FIG. 10A, when the driver operates the input switch to select the remote entry mode, the target parking space setting device 11 searches for three available parking spaces and displays an image including these parking spaces on a display. Here, it is assumed that the driver selects a parking space PS1 in response to the displayed image. In this case, the parking route generator 15 calculates entry routes R1 and R2 from the current position illustrated in FIG. 10A to the parking space PS1 illustrated in FIGS. 10B, 10C, and 10D.

On the other hand, at the parking position illustrated in FIG. 10D, when other vehicles V3 and V4 are parked on both sides of the subject vehicle V as indicated by dotted lines and it is difficult for the driver to open the door to get on the vehicle, the remote exit mode can be used to control the subject vehicle V to exit the parking space. This will be more specifically described. In the state illustrated in FIG. 10D, when the driver starts the internal combustion engine or drive motor of the subject vehicle V using the remote operation device 23 and operates the input switch of the remote operation device 23 to select the remote exit mode, the target parking space setting device 11 searches for an available exit space S1 illustrated in FIG. 10B, for example, and displays the exit space S1 on the display of the remote operation device 23. When the driver selects the exit space S1 in response to the display, the parking route generator 15 calculates an exit route from the current position illustrated in FIG. 10D to the exit space illustrated in FIGS. 10C and 10B. Thus, the parking route generator 15 calculates the entry route from the current position to the parking space in the case of the remote entry mode or calculates the exit route from the current position to the exit space in the case of the remote exit mode. Then, the parking route generator 15 outputs the entry route or the exit route to the route following controller 17 and the target vehicle speed generator 18.

The object deceleration calculator 16 receives the positional information of obstacles and other objects from the object detector 13 and operates to calculate the time for the subject vehicle to collide with an object (TTC: Time to Collision) on the basis of the distance from the object and the vehicle speed and calculate the deceleration start timing of the subject vehicle. For example, in the remote entry mode illustrated in FIGS. 10A to 10D, when the object as an obstacle is a wall W of the parking lot and the distance from the wall W is a predetermined value or more as illustrated in FIGS. 10A to 10C, the vehicle speed is set to an initial set value, and the vehicle speed of the subject vehicle V is decelerated at the timing when the time TTC for the subject vehicle V to collide with the wall W becomes a predetermined value or less as illustrated in FIG. 10D. Likewise, also when an abrupt obstacle is detected on the parking route during execution of the sequential autonomous parking control illustrated in FIGS. 10A to 10D, the subject vehicle V is decelerated or stopped at the timing when the time TTC for the subject vehicle V to collide with the obstacle becomes a predetermined value or less. This deceleration start timing is output to the target vehicle speed generator 18.

The route following controller 17 calculates, at predetermined time intervals, a target steering angle for the subject vehicle to follow a route along the entry route or the exit route on the basis of the entry route or the exit route from the parking route generator 15 and the current position of the subject vehicle from the vehicle position detector 12. As for the entry routes R1 and R2 of FIGS. 10A to 10D, the route following controller 17 calculates, at a predetermined time interval for each current position of the subject vehicle V, a target steering angle along the entry route R1 for traveling straight ahead from the current position illustrated in FIG. 10A to the position of turn for parking illustrated in FIG. 10B and a target steering angle along the entry route R2 for turning left from the position of turn for parking illustrated in FIG. 10B to the parking position illustrated in FIGS. 10C and 10D and outputs the calculated target steering angles to the steering angle controller 19.

The target vehicle speed generator 18 calculates, at predetermined time intervals, a target vehicle speed for the subject vehicle V to follow a route along the entry route or the exit route on the basis of the entry route or the exit route from the parking route generator 15 and the deceleration start timing from the object deceleration calculator 16. As for the entry routes of FIGS. 10A to 10D, the target vehicle speed generator 18 calculates, at a predetermined time interval for each current position of the subject vehicle V, a target vehicle speed when starting from the current position illustrated in FIG. 10A and stopping at the position of turn for parking illustrated in FIG. 10B, a target vehicle speed when starting (backing) from the position of turn for parking illustrated in FIG. 10B and turning left on the way to the parking position illustrated in FIG. 10C, and a target vehicle speed when approaching the wall W illustrated in FIG. 10D and outputs the calculated target vehicle speeds to the vehicle speed controller 20. When an abrupt obstacle is detected on the parking route during execution of the sequential autonomous parking control illustrated in FIGS. 10A to 10D, the timing of deceleration or stopping is output from the object deceleration calculator 16, and the target vehicle speed corresponding to that timing is therefore output to the vehicle speed controller 20.

The steering angle controller 19 generates a control signal for operating a steering actuator provided in the steering system of the subject vehicle V on the basis of the target steering angle from the route following controller 17. The vehicle speed controller 20 generates a control signal for operating an accelerator actuator provided in the drive system of the subject vehicle V on the basis of the target vehicle speed from the target vehicle speed generator 18. The steering angle controller 19 and the vehicle speed controller 20 are concurrently controlled thereby to execute the autonomous parking control.

The remote operation device 23 is used by an operator U from outside of the vehicle to command whether to continue or stop the execution of the autonomous parking control which is set by the target parking space setting device 11. To this end, the remote operation device 23 has a short-range communication function (such as using the antenna 231 illustrated in FIG. 7) for transmitting an execution continuation command signal or an execution stop signal to the route following controller 17 and the target vehicle speed generator 18 (these may alternatively be the steering angle controller 19 and the vehicle speed controller 20) and performs communication with the antennas 27 and 27 provided in the vehicle V. The remote exit mode requires a start/stop switch for the drive system (internal combustion engine or drive motor) of the subject vehicle V, an input switch for inputting the remote exit mode, and a display for displaying an image including the exit space, and it is therefore preferred to configure the remote operation device 23 using a portable computer with these functions. A telecommunication network may be used as the means for transmitting the execution continuation command signal or the execution stop signal from the remote operation device 23 to the route following controller 17 and the target vehicle speed generator 18 (these may alternatively be the steering angle controller 19 and the vehicle speed controller 20).

In the remote parking system 1 according to one or more embodiments of the present invention, a pairing process between the remote operation device 23 and an onboard device (the pairing processor 25) of the subject vehicle V is executed, and only when the subject vehicle V authenticates the remote operation device 23, the execution continuation command signal or the execution stop signal is accepted. In particular, in the remote parking system 1 according to one or more embodiments of the present invention, the subject vehicle includes the authentication code storage 24, the authentication code setting device 21, the authentication code display device 22, and the pairing processor 25, and the remote operation device 23 includes a reader 232. When start of the remote operation by the remote operation device 23 is input, a predetermined authentication code AC stored in the authentication code storage 24 is displayed inside or outside the subject vehicle V so as to be visible, and the displayed authentication code AC is acquired by the reader 232 of the remote operation device 23. After the authentication code AC is transmitted from the remote operation device 23 to the pairing processor 25 of the subject vehicle V, a determination is made whether or not an authentication code AC1 acquired by the remote operation device 23 matches the authentication code AC stored in the subject vehicle V. When these codes match each other, the pairing process between the subject vehicle V and the remote operation device 23 is assumed to be completed. For distinction between authentication codes, the predetermined authentication code stored in the authentication code storage 24 and the displayed authentication code are denoted by AC, and the authentication code acquired by the remote operation device 23 is denoted by AC1.

The authentication code storage 24 stores the predetermined (unique) authentication code AC which is set for the subject vehicle V. The authentication code AC includes, but is not limited to, at least any of a one-dimensional code, a two-dimensional code, a character, a numeral, a symbol, a figure, a pattern, a blinking pattern of a light, or a combination thereof. A plurality of authentication codes ACs may be stored, and when the pairing process is executed, the authentication code AC to be displayed may be regularly or irregularly selected (changed). The authentication code AC stored in the authentication code storage 24 is displayed at a certain position inside or outside the subject vehicle V by the authentication code display device 22, which will be described later, and the displayed authentication code AC is read using the reader 232 such as a camera provided in the remote operation device 23. When the authentication code AC is set as a code that can be input as text data, such as a character, a numeral, or a symbol, an input device provided in the remote operation device 23 may be used as substitute for the reader 232 of the remote operation device 23 to input such a character, numeral, symbol, or the like into the remote operation device 23. The predetermined authentication code stored in the authentication code storage 24 is read by the authentication code setting device 21 and the pairing processor 25.

The authentication code display device 22 displays the authentication code AC, which is stored in the authentication code storage 24, inside or outside the subject vehicle V so as to be visible. Examples of the authentication code display device 22 for displaying the authentication code AC inside the subject vehicle V include an onboard display, an interior light, and other similar devices. Examples of the authentication code display device 22 for displaying the authentication code AC outside the subject vehicle V include a headlight, a small light, a blinker, a fog light, a brake light, a backlight, and other similar devices and a display device for displaying the authentication code AC on the road surface around the subject vehicle V.

Figure 5:
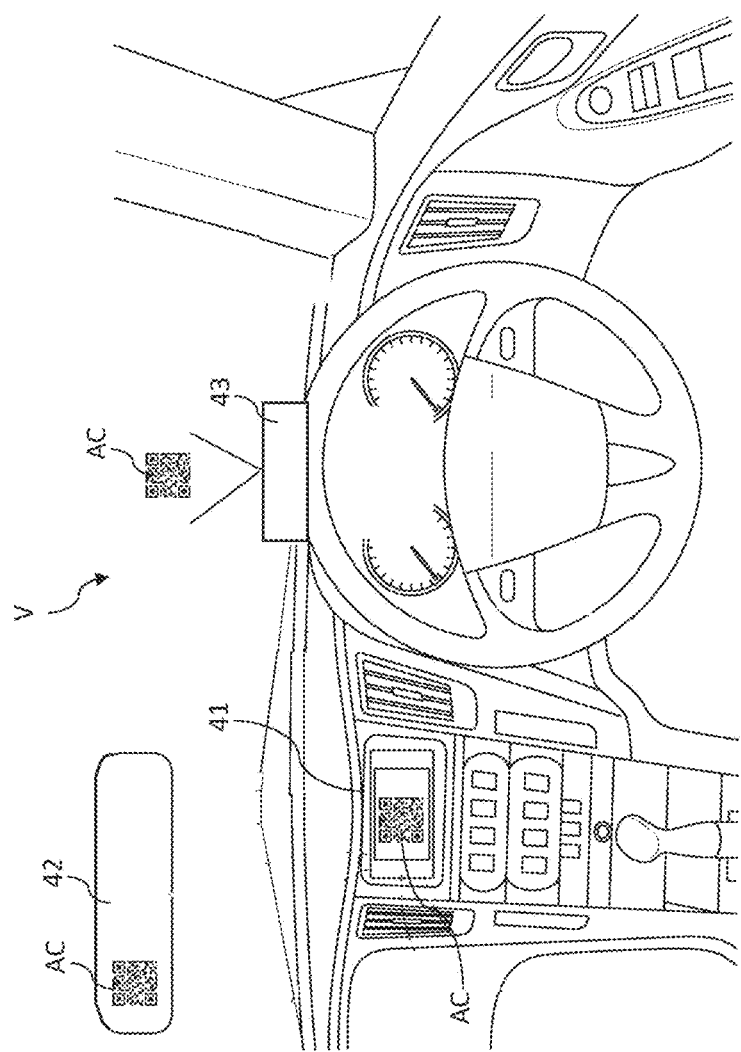
FIG. 5 is a plan view illustrating another example of display form by the authentication code display device of FIG. 1 (display inside the vehicle)

FIG. 5 is a diagram illustrating an example of display form in which the authentication code AC is displayed inside the subject vehicle V by the authentication code display device 22. In this example, the authentication code AC is displayed on a display 41 of a navigation device provided on the center console, a display 42 provided on the interior mirror (such as an interior mirror that displays a rear view captured by a camera), a head-up display 43, or the like. In this case, the display 41 of the navigation device, the display 42 provided on the interior mirror, and the head-up display 43 each serve as the authentication code display device 22.

Figure 6:
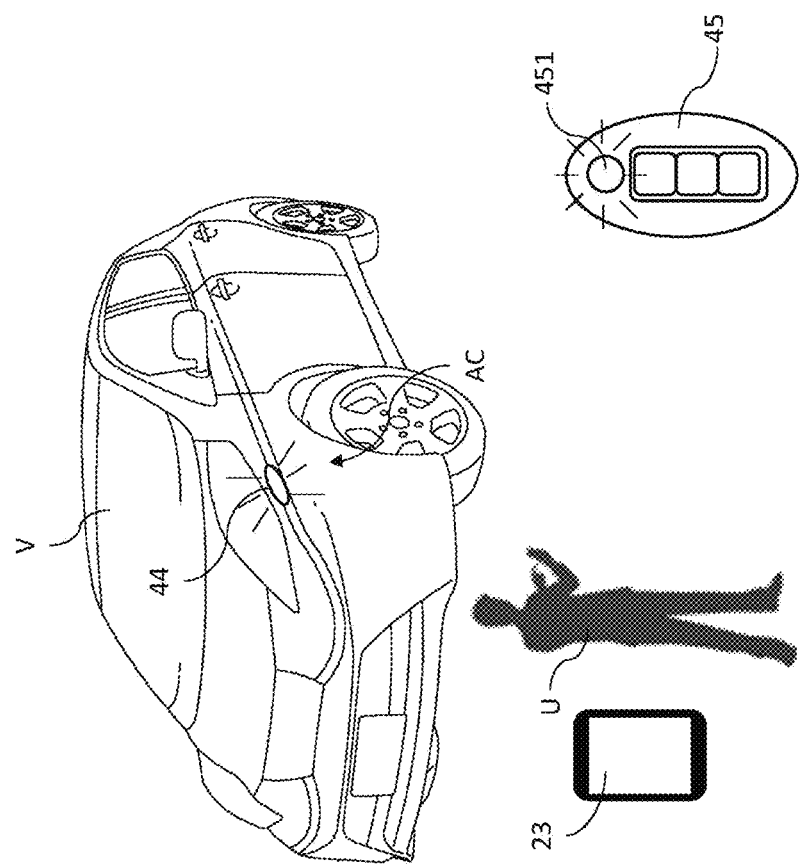
FIG. 6 is a plan view illustrating a still another example of display form by the authentication code display device of FIG. 1 (display outside the vehicle)

FIG. 6 is a diagram illustrating an example of display form in which the authentication code AC is displayed outside the subject vehicle V by the authentication code display device 22. In this example, provided that a device provided outside the subject vehicle V is used, the blinking pattern of a blinker 44 is displayed as the authentication code AC. Other than the blinker 44, a headlight, a small light, a fog light, a brake light, a backlight, or the like may also be used as the device provided outside the subject vehicle V. Additionally or alternatively, as illustrated in FIG. 6, an LED light 451 or the like may be provided on an electronic key 45 that remotely operates a locking/unlocking device for doors of the subject vehicle V or on a portable electronic device (not illustrated) such as an engine starter that remotely controls the start of the engine, and the blinking pattern of the LED light 451 may be displayed as the authentication code AC. The electronic key 45 or engine starter of this type is unique one for which short-range communication with a specific subject vehicle V is preliminarily established. When these lights are used, the authentication code AC can be set such that the blinking intervals are predetermined intervals. Examples of the display outside the subject vehicle V include, in addition to those in which the device provided outside the subject vehicle V is used for the display, those in which the authentication code display device 22 is used for the display on an outer panel of the subject vehicle V, such as a hood outer panel, a door outer panel, or a trunk lid outer panel. The authentication code display device 22 for use in this case may be a display device for display on the road surface, which will be described later.

Figure 3:
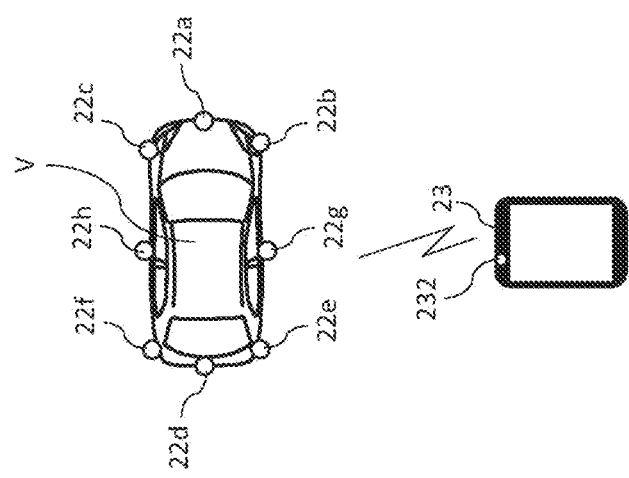
FIG. 3 is a plan view illustrating a remote operation device and a state in which authentication code display devices of FIG. 1 are attached to the vehicle.
Figure 4:
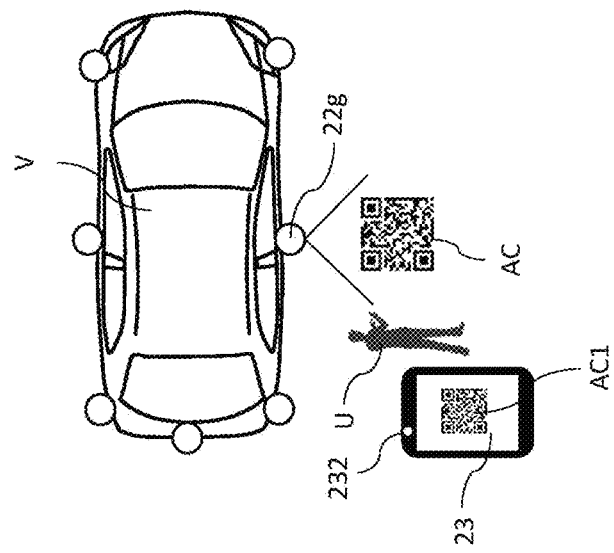
FIG. 4 is a plan view illustrating an example of display form by the authentication code display device of FIG. 1 (display at a certain position on a road surface)

FIG. 4 is a diagram illustrating an example of display form in which the authentication code AC is displayed on the road surface around the subject vehicle V by an authentication code display device 22, and FIG. 3 is a plan view illustrating an example of attaching authentication code display devices 22 in this case. Each of the authentication code display devices 22 in this example of display form is composed, for example, of an LED lighting device, a laser light irradiation device, or the like and emits visible light toward the road surface around the subject vehicle V. The pattern authentication code display devices 22 are attached to respective corresponding sites of the subject vehicle V. FIG. 3 illustrates an example in which, for example, authentication code display devices 22*a* to 22*h* are attached to eight respective sites of the center 22*a* and both sides 22*b* and 22*c* of the front bumper, the center 22*d* and both sides 22*e* and 22*f* of the rear bumper, and the sill outers 22*g* and 22*h* below the right and left center pillars. The sites to which the authentication code display devices 22 are attached and the number of the sites as illustrated in FIG. 3 are merely an example, and the authentication code display devices 22 may also be attached to other sites than those illustrated in the figure. The number of sites to which the authentication code pattern display devices 22 are attached may also be less than eight or nine or more. FIG. 4 illustrates an example of the authentication code AC projected onto the road surface by an authentication code display device 22 that is one of the authentication code display devices 22 provided at the eight respective sites in the above manner. FIG. 4 also illustrates a state in which the operator U who got off with the remote operation device 23 uses the reader 232 provided on the remote operation device 23 to capture an image of the authentication code AC displayed on the road surface and read the authentication code AC, and the read authentication code AC1 is displayed on the display of the remote operation device 23.

Referring again to FIG. 1, the authentication code setting device 21 sets the authentication code AC displayed by the authentication code display device 22 and its display position. When the authentication code display device 22 for use is the display 41 of the navigation device, the display 42 provided on the interior mirror, the head-up display 43, or other onboard device provided inside the vehicle as illustrated in FIG. 5 or the blinker 44, headlight, small light, fog light, brake light, backlight, or other device provided outside the vehicle as illustrated in FIG. 6, the display position of the authentication code AC is uniquely determined. On the other hand, when the authentication code AC is displayed on the road surface around the subject vehicle V using the plurality of authentication code display devices 22*a* to 22*h* provided on the subject vehicle V as illustrated in FIG. 4, the operator U carrying the remote operation device 23 is in a state of getting off the vehicle, and it is therefore preferred to display the authentication code AC at a position which the operator U can easily find.

To this end, the authentication code setting device 21 selects the authentication code display device 22 so as to display the authentication code AC on the road surface in the vicinity of the position of the remote operation device 23 detected by the position detector 14 for the remote operation device 23, that is, on the road surface toward the remote operation device 23 from the subject vehicle V. For example, in the case illustrated in FIG. 4, the operator U is in a state of getting off from the driver seat and the position of the remote operation device 23 is on the right side of the subject vehicle V; therefore, the authentication code setting device 21 provides the setting so as to use any of the authentication code display devices 22b, 22g, and 22e attached to the right side of the subject vehicle V among the eight authentication code display devices 22a to 22h and outputs this setting to the authentication code display devices 22a to 22h. Instead of detecting the position of the remote operation device 23 by the position detector 14 for the remote operation device 23, another setting may be provided so as to use any of the authentication code display devices 22b, 22g, and 22e attached to the right side of the subject vehicle V when detecting that the door on the driver seat side is opened in a vehicle with the steering wheel on the right side.

FIG. 2A is a block diagram illustrating an example of a configuration related to the pairing process executed in the remote parking system 1 according to one or more embodiments of the present invention. In the example illustrated in the figure, the remote operation device 23 includes a reader 232 such as a camera that acquires the authentication code AC displayed by the authentication code display device 22 and a display that displays the read authentication code AC1. The subject vehicle V includes a reader 26 such as a camera that acquires the read authentication code AC1 displayed on the display of the remote operation device 23. The reader 26 may share a camera for other purposes provided for capturing an image around the subject vehicle V.

In this example, as illustrated in FIG. 2A, the authentication code display device 22 is used to display a predetermined authentication code stored in the authentication code storage 24 at a certain position on the road surface that is set by the authentication code setting device 21. The operator U carrying the remote operation device 23 finds this display and acquires the displayed authentication code AC using the reader 232 of the remote operation device 23, and the read authentication code AC1 is displayed on the display. Then, the operator U makes the display of the remote operation device 23 face the reader 26 of the subject vehicle V. The reader 26 of the subject vehicle V is turned on while the authentication code AC is displayed by the authentication code display device 22. This allows the reader 26 to acquire the authentication code AC1 displayed on the display of the remote operation device 23, and the acquired authentication code AC1 is output to the pairing processor 25. The pairing processor 25 compares the authentication code AC1 output from the reader 26 with the authentication code AC stored in the authentication code storage 24 using image processing or the like thereby to determine the matching and, when the matching is within an acceptable range, the pairing is completed.

FIG. 2B is a block diagram illustrating another example of a configuration related to the pairing process executed in the remote parking system 1 according to one or more embodiments of the present invention. In the example illustrated in the figure, the remote operation device 23 includes a reader 232 such as a camera that acquires the authentication code AC displayed by the authentication code display device 22 and has a short-range communication function for transmitting the read authentication code AC1 to the subject vehicle V. The subject vehicle V also has a short-distance communication function for receiving the authentication code AC1 transmitted from the remote operation device 23. These short-range communication functions (which are each achieved by a communication device such as one or more antennas and a software program that executes a communication process) may share the antennas 27 and 231 illustrated in FIG. 7.

In this example, as illustrated in FIG. 2B, the authentication code display device 22 is used to display a predetermined authentication code stored in the authentication code storage 24 at a certain position on the road surface that is set by the authentication code setting device 21. The operator U carrying the remote operation device 23 finds this display and acquires the displayed authentication code AC using the reader 232 of the remote operation device 23. Then, the operator U transmits the authentication code AC1 to the subject vehicle V using the short-range communication function of the remote operation device 23. The subject vehicle V receives the authentication code AC1 using the short-distance communication function and outputs the authentication code AC1 to the pairing processor 25. The pairing processor 25 compares the received authentication code AC1 with the authentication code AC stored in the authentication code storage 24 using image processing or the like thereby to determine the matching and, when the matching is within an acceptable range, the pairing is completed.

The control flow of the remote parking system 1 according to one or more embodiments of the present invention will then be described with reference to FIGS. 8, 9A, and 9B. FIG. 8 is a flowchart illustrating a control procedure executed in the remote parking system 1 according to one or more embodiments of the present invention.

Here, a scene will be described in which the reverse parking illustrated in FIGS. 10A to 10D is executed by the autonomous parking control (entry). This scene represents an example of display form in which, as illustrated in FIG. 4, the authentication code AC for the pairing process is mainly displayed on the road surface around the subject vehicle V. First, when the subject vehicle V arrives in the vicinity of parking spaces, in step S1, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to display available parking spaces and encourages the operator U to select a desired parking space. When the operator U selects a specific parking space as a target parking space, the target parking space setting device 11 outputs the target parking position information to the parking route generator 15. In step S5, the parking route generator 15 generates parking routes R1 and R2 illustrated in FIGS. 10B to 10D from the current position of the subject vehicle V and the target parking position, and the object deceleration calculator 16 calculates the deceleration start timing in the autonomous parking control on the basis of the object information detected by the object detector 13. The parking routes generated by the parking route generator 15 are output to the route following controller 17, and the deceleration start timing calculated by the object deceleration calculator 16 is output to the target vehicle speed generator 18.

Through the above processes, the autonomous parking control comes into a standby state. When the operator U is encouraged to accept the start of the autonomous parking control and then accepts the start, the autonomous parking control is started. In the reverse parking illustrated in FIG. 10A, once the vehicle moves forward from the current position illustrated in FIG. 10A and reaches the position of turn for parking illustrated in FIG. 10B, the operator U is encouraged to get off the vehicle in step S6. Then, as illustrated in FIG. 10C, the vehicle moves backward while steering to the left and moves straight to the parking space PS1 illustrated in FIG. 10D.

When the operator U is encouraged to get off the vehicle in step S6 and gets off with the remote operation device 23 during the execution of such autonomous parking control, the operator U activates the remote operation device 23 in step S7. This starts the remote operation. Examples of the start input for the remote operation by the remote operation device 23 include the activation of the operation software program installed in the remote operation device 23, the operation of unlocking the doors, the operation of locking/unlocking the doors, and the activation of these operations and the operation software program. The subject vehicle V is in a stop state during steps S6 to S9. In the example of display form in which, as illustrated in FIG. 5, the authentication code AC is displayed on the display 41 of the navigation device, the display 42 provided on the interior mirror, the head-up display 43, or other onboard device provided inside the vehicle, the authentication code AC is displayed before the operator U is encouraged to get off the vehicle in step S6.

In step S8, the position detector 14 for the remote operation device 23 detects the position of the remote operation device 23, and this positional information is output to the authentication code setting device 21. Then, in step S9, the pairing process between the remote operation device 23 and the subject vehicle V is performed. FIG. 9A is a flowchart illustrating an example of the subroutine of step S9 in FIG. 8.

Figure 9A:
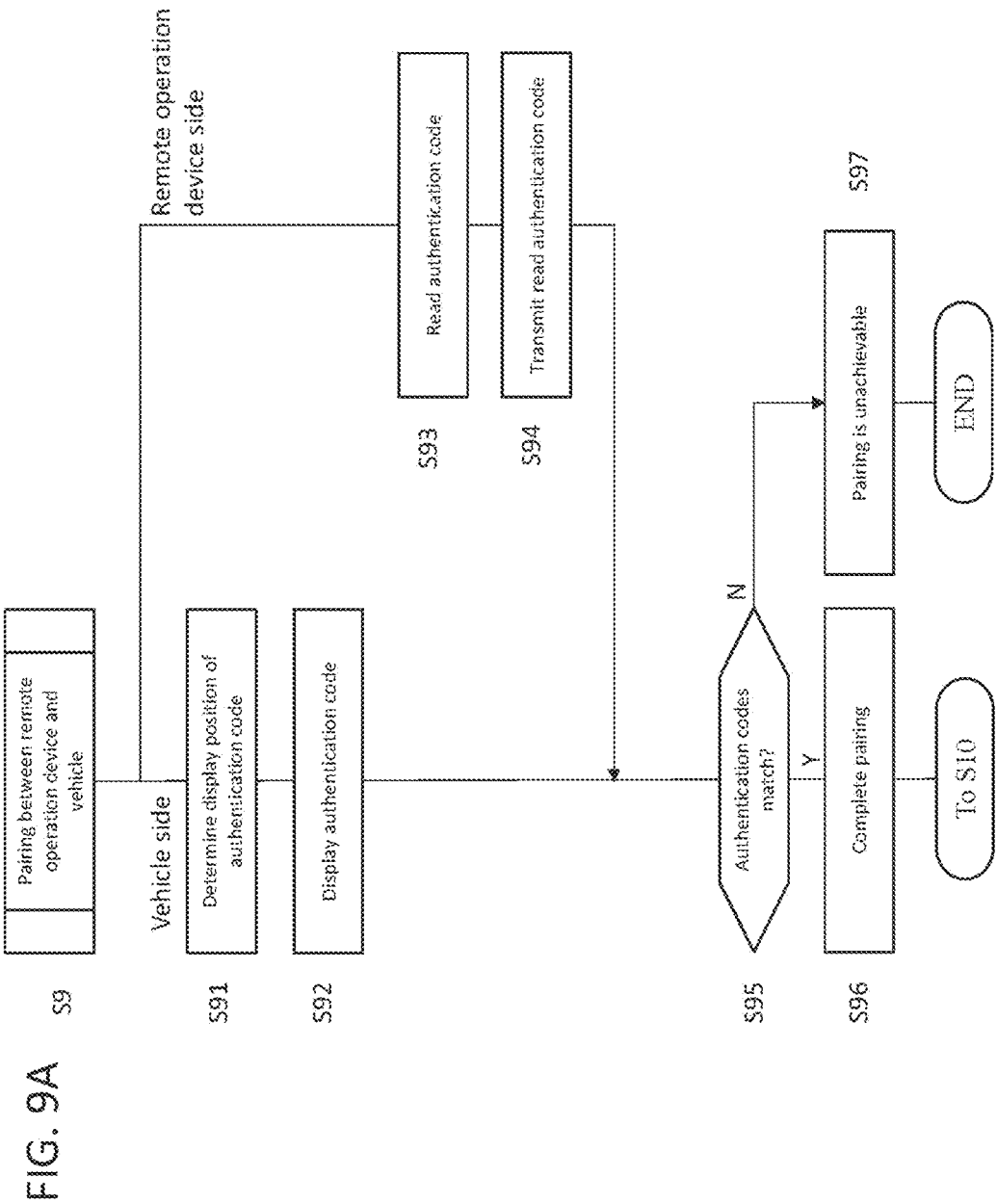
FIG. 9A is a flowchart illustrating an example of the subroutine of step S9 in FIG. 8.

In the example of the pairing process illustrated in FIG. 9A, in step S91, the authentication code setting device 21 determines the position on the road surface on which the authentication code AC is displayed, on the basis of the position of the remote operation device 23 detected by the position detector 14 for the remote operation device 23. The position on the road surface toward the standing position of the operator U from the subject vehicle V is set as the display position of the authentication code AC so that the operator U can easily find the authentication code AC. In step S92, the authentication code AC is displayed at the determined position on the road surface by the authentication code display device 22 to which the display position information from the authentication code setting device 21 is input. In the example illustrated in FIG. 4, the operator U is in a state of getting off from the driver seat and the detected position of the remote operation device 23 is on the right side of the subject vehicle V; therefore, the authentication code setting device 21 outputs a command to operate any of the authentication code display devices 22b, 22g, and 22e attached to the right side of the subject vehicle V among the eight authentication code display devices 22a to 22h, and the authentication code AC is displayed on the road surface using any of the authentication code display devices 22b, 22g, and 22e.

In step S93, the operator U carrying the remote operation device 23 finds the authentication code AC displayed on the road surface and acquires the displayed authentication code AC using the reader 232 of the remote operation device 23, and the read authentication code AC1 is displayed on the display. Then, in step S94, the operator U makes the display of the remote operation device 23 face the reader 26 of the subject vehicle V. The reader 26 of the subject vehicle V is turned on while the authentication code AC is displayed by the authentication code display device 22. This allows the reader 26 to acquire the authentication code AC1 displayed on the display of the remote operation device 23, and the acquired authentication code AC1 is output to the pairing processor 25. In the example of display form illustrated in FIG. 2B, the operator U transmits the read authentication code AC1 to the subject vehicle V using the short-range communication function of the remote operation device 23.

In step S95, the pairing processor 25 compares the authentication code AC1 output from the reader 26 with the authentication code AC stored in the authentication code storage 24 using image processing or the like thereby to determine the matching and, when the matching is within an acceptable range, the process proceeds to step S96 to complete the pairing. On the other hand, in step S95, when the matching between the authentication code AC1 output from the reader 26 and the authentication code AC stored in the authentication code storage 24 is not within the acceptable range, the process proceeds to step S97, in which the pairing is determined to be unachievable, and the remote parking control illustrated in FIG. 8 is concluded. The display period of the authentication code AC by the authentication code display device 22 ends at least any of when the pairing process is completed, when a predetermined time has elapsed after displaying the authentication code AC, or when a command to end the display is input.

FIG. 9B is a flowchart illustrating another example of the subroutine of step S9 in FIG. 8. In this example of the pairing process, the same authentication code AC as the authentication code AC stored in the authentication code storage 24 of the subject vehicle V is preliminarily registered in an authentication code storage 233 of the remote operation device 23 illustrated in FIGS. 2A and 2B, and when the matching is determined between the authentication code AC1 read by the remote operation device 23 and the authentication code AC stored in the authentication code storage 24, the matching is determined between the authentication code AC1 read by the remote operation device 23 and the authentication code AC stored in the authentication code storage 233.

This will be more specifically described. In step S91 of FIG. 9B, the authentication code setting device 21 determines the position on the road surface on which the authentication code AC is displayed, on the basis of the position of the remote operation device 23 detected by the position detector 14 for the remote operation device 23. The position on the road surface toward the standing position of the operator U from the subject vehicle V is set as the display position of the authentication code AC so that the operator U can easily find the authentication code AC. In step S92, the authentication code AC is displayed at the determined position on the road surface by the authentication code display device 22 to which the display position information from the authentication code setting device 21 is input. In the example illustrated in FIG. 4, the operator U is in a state of getting off from the driver seat and the detected position of the remote operation device 23 is on the right side of the subject vehicle V; therefore, the authentication code setting device 21 outputs a command to operate any of the authentication code display devices 22b, 22g, and 22e attached to the right side of the subject vehicle V among the eight authentication code display devices 22a to 22h, and the authentication code AC is displayed on the road surface using any of the authentication code display devices 22b, 22g, and 22e. The above processes are the same as those in the example illustrated in FIG. 9A.

In step S93, the operator U carrying the remote operation device 23 finds the authentication code AC displayed on the road surface and acquires the displayed authentication code AC using the reader 232 of the remote operation device 23. Then, in step S94, the remote operation device 23 refers to the authentication code AC which is preliminarily registered in the authentication code storage 233, and in step S95, the remote operation device 23 compares the authentication code AC1 output from the reader 232 with the authentication code AC, which is preliminarily registered in the authentication code storage 233, using image processing or the like thereby to determine the matching. Then, when the matching is within an acceptable range, the process proceeds to step S96 to complete the pairing. On the other hand, in step S95, when the matching between the authentication code AC1 output from the reader 232 and the authentication code AC registered in the authentication code storage 233 is not within the acceptable range, the process proceeds to step S97, in which the pairing is determined to be unachievable, and the remote parking control illustrated in FIG. 8 is concluded. The display period of the authentication code AC by the authentication code display device 22 ends at least any of when the pairing process is completed, when a predetermined time has elapsed after displaying the authentication code AC, or when a command to end the display is input.

Referring again to FIG. 8, when the pairing process of step S9 enables the subject vehicle V to authenticate the remote operation device 23 so that the command can be received, the remote operation is started in step S10, followed by steps S11 to S13, in which the operator U continues to press the execution button of the remote operation device 23 ("Y" in step S12) thereby to maintain the execution of the remote parking control. On the other hand, when the operator U presses the stop button of the remote operation device 23 (or releases the execution button), the stop command for the remote parking control is transmitted to the route following controller 17 and the target vehicle speed generator 18 (these may alternatively be the steering angle controller 19 and the vehicle speed controller 20) ("N" in step S12), and the remote parking control is suspended in step S13. In the case in which the safety is confirmed while the remote parking control is suspended or in other similar cases, the operator U continues to press the execution button of the remote operation device 23 again, and the execution of the remote parking control is thereby resumed (step S13→S12).

When the operator U gets out of the vehicle and continues to press the execution button of the remote operation device 23, the route following controller 17 sequentially outputs the target steering angle along the parking routes to the steering angle controller 19, and the target vehicle speed generator 18 sequentially outputs the target vehicle speed along the parking routes to the vehicle speed controller 20. This allows the subject vehicle V to execute the autonomous parking control along the parking routes at the target vehicle speed. During this operation, the object detector 13 detects the presence or absence of an object such as an obstacle present around the subject vehicle V. When an obstacle is detected on the parking routes, the object deceleration calculator 16 calculates the deceleration start timing to decelerate or stop the subject vehicle V. The processes from step S11 to step S14, which is to be described below, are executed at predetermined time intervals until the subject vehicle V arrives at the target parking space in step S14.

In step S14, a determination is made whether or not the subject vehicle V has arrived at the target parking space. When the subject vehicle V has not arrived, the process returns to step S11, while when the subject vehicle V has arrived at the target parking space, the above autonomous parking control is concluded.

As described above, according to the remote parking system 1 of one or more embodiments of the present invention, when start of the remote operation by the remote operation device 23 is input, the predetermined authentication code AC stored in the authentication code storage 24 of the subject vehicle V is displayed inside or outside the subject vehicle V so as to be visible, the displayed authentication code AC is acquired by the remote operation device 23, a determination is made by the pairing processor 25 as to whether or not the authentication code AC1 acquired by the remote operation device 23 matches the authentication code AC stored in the authentication code storage 24 of the subject vehicle V, and upon the matching, the paring process between the subject vehicle V and the remote operation device 23 is completed. The pairing process can therefore be executed by a simple method even when the autonomous travel control by the remote operation is performed for the subject vehicle, which is stopped at an arbitrary place, from outside the vehicle.

According to the remote parking system 1 of one or more embodiments of the present invention, the predetermined authentication code AC stored in the authentication code storage 24 of the subject vehicle V is displayed at least at any of a device provided inside the subject vehicle V, a device provided outside the subject vehicle V, an outer panel of the subject vehicle V, or a road surface around the subject vehicle V; therefore, the operator U carrying the remote operation device 23 can easily find the authentication code AC.

According to the remote parking system 1 of one or more embodiments of the present invention, the device provided inside the subject vehicle V includes at least any of an onboard display 41, 42, or 43 or an interior light, and the device provided outside the subject vehicle V includes at least any of a headlight, a small light, a blinker 44, a fog light, a brake light, or a backlight; therefore, a separate device need not be provided.

According to the remote parking system 1 of one or more embodiments of the present invention, the position of the remote operation device 23 is detected, and the predetermined authentication code stored in the authentication code storage 24 of the subject vehicle V is displayed on the road surface around the subject vehicle V toward the remote operation device 23 from the subject vehicle V; therefore, the operator U carrying the remote operation device 23 can more easily find the authentication code AC.

According to the remote parking system 1 of one or more embodiments of the present invention, the predetermined authentication code AC is read by the reader 232 provided in the remote operation device 23 or the predetermined authentication code AC is input by an input device provided in the remote operation device 23; therefore, the pairing process can be executed by a simple operation.

According to the remote parking system 1 of one or more embodiments of the present invention, the authentication code AC1 acquired by the remote operation device 23 is displayed on a display provided in the remote operation device 23, the authentication code AC1 acquired by the remote operation device 23 is read by the reader 26 provided in the subject vehicle V, and the pairing processor 25 of the subject vehicle V determines whether or not the authentication code AC1 read by the reader 26 matches the authentication code AC stored in the authentication code storage 24 of the subject vehicle V; therefore, the pairing process can be executed without using a communication function.

According to the remote parking system 1 of one or more embodiments of the present invention, the remote operation device 23 transmits the acquired authentication code AC1 to the subject vehicle V via the short-range communication, and the pairing processor 25 of the subject vehicle V determines whether or not the transmitted authentication code AC1 matches the predetermined authentication code AC stored in the authentication code storage 24 of the subject vehicle V; therefore, the pairing process can be executed without using a large-scale electric communication network such as the Internet.

According to the remote parking system 1 of one or more embodiments of the present invention, the predetermined authentication code AC stored in the authentication code storage 24 of the subject vehicle V is preliminarily registered in the authentication code storage 233 of the remote operation device 23, and when acquiring the predetermined authentication code AC displayed by the subject vehicle V, the remote operation device 23 determines whether or not the acquired authentication code AC1 matches the preliminarily registered predetermined authentication code AC; therefore, the pairing process can be executed without using a communication function.

According to the remote parking system 1 of one or more embodiments of the present invention, the display of the predetermined authentication code AC ends at least any of when the pairing process is completed, when a predetermined time has elapsed from the display, or when a command to end the display is input; therefore, the authentication code is prevented from being known by a third person.

According to the remote parking system 1 of one or more embodiments of the present invention, the predetermined authentication code includes at least any of a one-dimensional code, a two-dimensional code, a character, a numeral, a symbol, a figure, a pattern, and a blinking pattern of a light; therefore, the pairing process can be executed with a high degree of freedom.

According to the remote parking system 1 of one or more embodiments of the present invention, a plurality of predetermined authentication codes is stored, and when the pairing process is executed, the predetermined authentication code is regularly or irregularly selected; therefore, the pairing process can be executed with a higher degree of accuracy.

According to the remote parking system 1 of one or more embodiments of the present invention, the vehicle having the autonomous travel control function is controlled to enter a predetermined space by the autonomous travel control or exit a predetermined space by the autonomous travel control on the basis of an execution command or a stop command from the remote operation device 23 located outside the subject vehicle V; therefore, the subject vehicle V can be autonomously parked even into a narrow parking space with a high degree of accuracy.

The above steering angle controller 19 and vehicle speed controller 20 correspond to the travel controller according to the present invention, the above target parking space setting device 11, parking route generator 15, route following controller 17, and target vehicle speed generator 18 correspond to the controller according to the present invention, the above authentication code storage 24 corresponds to the authentication code storage according to the present invention, and the above pairing processor 25 corresponds to the pairing processor according to the present invention.

DESCRIPTION OF REFERENCE NUMERALS

1 Remote parking system
11 Target parking space setting device
12 Vehicle position detector
13 Object detector
14 Position detector for remote operation device
15 Parking route generator
16 Object deceleration calculator
17 Route following controller
18 Target vehicle speed generator
19 Steering angle controller
20 Vehicle speed controller
21 Authentication code setting device
22 Authentication code display device
23 Remote operation device
231 Antenna
232 Reader
233 Authentication code storage
24 Authentication code storage
25 Pairing processor
26 Reader
27 Antenna
41 Display of navigation device
42 Display of interior mirror
43 Head-up display
44 Blinker
45 Electronic key
451 LED light
V Subject vehicle
V1 to V4 Other vehicles
AC Authentication code
AC1 Read authentication code
PS1, PS2, PS3 Parking space
S1 Exit space
U Operator
W Obstacle (object)
R1, R2 Parking route

The invention claimed is:

1. A vehicle travel control method comprising:
upon autonomous travel control of a vehicle having an autonomous travel control function based on a remote operation command from a remote operation device, which corresponds to the vehicle, located outside the vehicle, when start of a remote operation by the remote operation device is input,
displaying a predetermined authentication code stored in the vehicle inside or outside the vehicle so as to be visible;
acquiring the predetermined authentication code displayed inside or outside the vehicle so as to be visible using the remote operation device;

determining whether or not the predetermined authentication code acquired using the remote operation device matches the predetermined authentication code stored in the vehicle; and upon matching, completing a pairing process between the vehicle and the remote operation device.

2. The vehicle travel control method according to claim 1, comprising displaying the predetermined authentication code stored in the vehicle at least at any of a device provided inside the vehicle, a device provided outside the vehicle, an outer panel of the vehicle, a portable device uniquely set for the vehicle, or a road surface around the vehicle.

3. The vehicle travel control method according to claim 2, wherein the device provided inside the vehicle includes at least any of an onboard display or an interior light, the device provided outside the vehicle includes at least any of a headlight, a small light, a blinker, a fog light, a brake light, or a backlight, and the portable device uniquely set for the vehicle includes at least any of an electronic key that has a light and remotely controls locking/unlocking of a door of the vehicle or an engine starter that has a light and remotely controls start of an engine of the vehicle.

4. The vehicle travel control method according to claim 2, comprising:

detecting a position of the remote operation device; and displaying the predetermined authentication code stored in the vehicle on the road surface around the vehicle toward the remote operation device from the vehicle.

5. The vehicle travel control method according to claim 1, comprising reading the predetermined authentication code by a reader provided in the remote operation device or inputting the predetermined authentication code by an input device provided in the remote operation device.

6. The vehicle travel control method according to claim 1, comprising:

displaying the predetermined authentication code acquired using the remote operation device on a display provided in the remote operation device as a displayed authentication code; and reading, by a reader provided in the vehicle, the displayed authentication code, wherein the vehicle determines whether or not the displayed authentication code read by the reader matches the predetermined authentication code stored in the vehicle.

7. The vehicle travel control method according to claim 1, wherein the remote operation device transmits the predetermined authentication code acquired by the remote operation device back to the vehicle via short-range communication as a transmitted authentication code, and the vehicle determines whether or not the transmitted authentication code matches the predetermined authentication code stored in the vehicle.

8. The vehicle travel control method according to claim 1, wherein the predetermined authentication code stored in the vehicle is preliminarily registered in the remote operation device as a preliminarily registered authentication code, and when acquiring the predetermined authentication code displayed by the vehicle, the remote operation device determines whether or not the predetermined authentication code acquired using the remote operation device matches the preliminarily registered predetermined authentication code.

9. The vehicle travel control method according to claim 1, wherein display of the predetermined authentication code ends at least any of when the pairing process is completed, when a predetermined time has elapsed from the display, or when a command to end the display is input.

10. The vehicle travel control method according to claim 1, wherein the predetermined authentication code includes at least any of a one-dimensional code, a two-dimensional code, a character, a numeral, a symbol, a figure, a pattern, and a blinking pattern of a light.

11. The vehicle travel control method according to claim 1, wherein a plurality of predetermined authentication codes is stored, and when the pairing process is executed, the predetermined authentication code is regularly or irregularly selected.

12. The vehicle travel control method according to claim 1, wherein the vehicle having the autonomous travel control function is controlled to enter a predetermined space by the autonomous travel control or exit a predetermined space by the autonomous travel control on a basis of an execution command or a stop command from the remote operation device located outside the vehicle.

13. A vehicle travel control apparatus comprising:

a travel controller configured to perform autonomous travel control of a vehicle having an autonomous travel control function;

a controller configured to calculate a route to a predetermined target position and output a travel command to the travel controller;

a remote operation device configured to command to execute or stop the controller from outside of the vehicle;

an authentication code storage configured to store a predetermined authentication code;

an authentication code display device configured to display the predetermined authentication code inside or outside the vehicle so as to be visible;

an acquisition device configured to acquire the predetermined authentication code which is displayed inside or outside the vehicle using the authentication code display device; and a pairing processor configured to determine whether or not the predetermined authentication code acquired using the acquisition device matches the predetermined authentication code stored in the authentication code storage and, upon matching, complete a pairing process between the vehicle and the remote operation device.

* * * * *